United States Patent [19]

Hanks

[11] Patent Number: 5,548,192

[45] Date of Patent: Aug. 20, 1996

[54] ADAPTIVE FEEDBACK SYSTEM FOR CONTROLLING HEAD/ARM POSITION IN A DISK DRIVE

[75] Inventor: D. Mitchel Hanks, Boise, Id.

[73] Assignee: Hewlett-Packard Company, Palo Alto, Calif.

[21] Appl. No.: 490,478

[22] Filed: Jun. 14, 1995

[51] Int. Cl.$^6$ ............................................. G05B 19/00
[52] U.S. Cl. ........................ 318/560; 318/561; 318/609; 364/151; 364/159; 364/165
[58] Field of Search ................................ 318/560, 561, 318/606–611; 364/148–151, 158–165, 176, 177, 514, 516, 517

[56] References Cited

U.S. PATENT DOCUMENTS

| | | | |
|---|---|---|---|
| 5,023,808 | 6/1991 | Seraji | 364/514 |
| 5,175,678 | 12/1992 | Frerich et al. | 364/148 |
| 5,223,778 | 6/1993 | Svarovsky et al. | 318/610 |
| 5,371,451 | 12/1994 | Toyosawa et al. | 318/568.13 |
| 5,381,359 | 1/1995 | Abbott et al. | 364/724.19 |
| 5,404,418 | 4/1995 | Nagano | 388/806 |
| 5,471,504 | 11/1995 | Lee et al. | 375/233 |

OTHER PUBLICATIONS

"30 Years of Adaptive Neural Networks: Perceptron, Madaline, and Backpropagation" PROC IEEE, Aug. 1990, B. Widrow, M. Lehr.

*Primary Examiner*—Brian Sircus

[57] ABSTRACT

A method for adjusting a compensator in a feedback control system for a coupled plant, derives a plurality of forward error values from position error signals that are sensed as outputs from the plant in response to a disturbance of the plant's operation. The position error signals are determined over plural, increasingly forward, time segments. A plurality of compensator output values are also determined over predetermined plural increasing forward, time segments. The derived forward error values are applied as inputs to the plant in a back propagation order, that order being in reverse time order to the time order in which the forward position error values were derived. Plural back propagation error values result in response to the back propagation application of the forward position error values. The back propagation error values are derived from within a portion of the compensator which has been configured as a Direct Form II filter function. The plural back propagation error values are then utilized in conjunction with the compensator output values and the forward position error values to derive altered compensator gain stage values to enable a reduction of the forward error values. To provide increased correction capability, the forward position error signals are altered by weighting functions before being employed as inputs to achieve the back propagation error values.

7 Claims, 4 Drawing Sheets

ADAPTIVE FEEDBACK SYSTEM FOR CONTROLLING HEAD/ARM POSITION IN A DISK DRIVE

FIELD OF THE INVENTION

This invention relates to adaptive feedback systems and, more particularly to an adaptive position control feedback system which employs linear temporal back propagation of position error signals to achieve improved position control.

BACKGROUND OF THE INVENTION

Disk drives include both separate servo tracks and "embedded" servo tracks to enable position error signals to be derived which are then used to control the position of a head/arm actuator to achieve improved head/track alignment. Servo data generally contains two bursts of data that are offset on either side of a track's center line. If a transducer head is properly positioned with respect to a track's center line, signals derived from offset bursts in the servo track are equal and no corrective operation is required. If there is an inequality in the sensed signals, the inequality is converted to a digital value and is fed to a correction or compensating circuit which generates a correction voltage that is fed to the head/arm actuator. The correction voltage preferably enables the head to be properly re-positioned with as little undershoot or overshoot as possible.

The correction circuit, if properly designed, enables positioning of a transducer head over a track's center line (i) if the track is nonconcentric, (ii) if the head/arm structure is subject to vibration or shock or (iii) if other noise is present in the servo signal which gives rise to a manifestation of a mispositioning of the head.

Referring to FIG. 1, a prior art control system is illustrated and includes a head/arm actuator 10 and a transducer head 12 that is positioned over a disk 14. When transducer head 12 is positioned over servo information, a signal is fed, via a demodulator 15, to a sense amplifier 16 and thence, via an analog to digital (A/D) converter 18, to a compensator 20. In addition, the output from A/D converter 18 is fed to a processor 22 where the digitized data values are stored in a memory 24. In order to cause actuator 10 to move transducer head 12 to a specified track, an address is fed from processor 22 to an actuator control circuit 26 which, in turn, operates actuator 10 to position transducer head 12 over the track indicated by the address. Included, but not shown, in actuator 10 is a digital to analog converter.

In FIG. 2, a prior art control schematic illustrates a compensator 20 and plant 30. Plant 30 includes actuator control 26, actuator 10 and transducer head 12 as shown in FIG. 1. Compensator 20 is represented in the control schematic by an infinite impulse response (IIR) filter 32 and a finite impulse response (FIR) filter 34. Filters 32 and 34 are represented as second order filters in that each is provided with a pair of unit time segment delay elements $z^{-1}$. FIR filter 34 includes three adjustable gain stages Cf0, Cf1, Cf2. IIR filter 32 includes a pair of adjustable gain stages Cb1 and Cb2. A summer 36 serves as an input node for compensator 20 and a summer 38 provides an output node therefor. The output from summer node 38 is fed back to the unit time delay elements in IIR filter 32 to enable a continued filtering action to be accomplished.

Those skilled in the art will realize that the control schematic illustration of compensator 20 is merely representative of the functions that are performed therein. In general, those functions will be performed by an appropriately programmed digital signal processor which will insert the proper time delays and gain values for the various gain stages to enable the filtering actions to be accomplished.

The output from compensator 20 is fed through a summing node 40 which serves also as an input point for an externally applied acceleration disturbance signal A(k). Plant 30 receives the input from summer 40, reacts to that input (and any disturbance contained therein) and provides an output response signal to summer node 42. A further input to summer node 42 is a desired position value (generally equal to 0) which enables the output of summer 42 to manifest a position error signal (PES) over each of a plurality of time intervals O-k. Each PES(k) value (for each k time) is fed back to summer 36. There the fed back value is subjected to a filtering action within compensator 20 in accordance with the gain values present in each of the component gain stages.

In order to enable adjustment of each of the gain stages in compensator 20, the prior art teaches that a "least mean squares" (LMS) algorithm provides a means for calculating appropriate adjustments. The LMS algorithm adjusts coefficients of an FIR/IIR filter by adjusting them in proportion to the inputs, scaled by an error value and an adaptation coefficient. The adjustment constitutes an estimate of the gradient of the mean squared error of the output (when compared to some desired output) with respect to the compensator coefficients. With knowledge of the gradient, the coefficients are then adjusted in a direction of the negative gradient, which is a direction toward the point of minimum mean squared error.

A further known technique for improving compensation actions is termed "back-propagation through time" and involves calculating the effective error associated with each control sample generated by the compensator during the closed loop system's response to some disturbance. Since each compensator command signal affects not only the next position error signal but also all future position error signals (to some degree), back-propagation through time attempts to determine the overall error attributable to each compensator command signal. This "effective error" is then used in the LMS algorithm to update the weights.

Back propagation through time has been mainly applied in the field of neural networks which include nonlinear functional blocks for achieving non linear transfer functions or decision circuits that could not be accomplished linearly. The back propagation procedure essentially takes an average of the compensator's contribution to present and later errors for each command signal, and uses this average to adjust the compensator in a direction that reduces the average error.

The determination of back propagation correction values is accomplished in the prior art by analyzing a closed loop system as a feed forward system. This is done by first generating a digital filter model of the plant and then applying an analytical technique known as 'unfolding in time' to represent the feedback system as strictly a feedforward system for a finite number of samples. The plant and compensator elements are copied multiple times in cascade. Each plant and each compensator in the cascade sums the delayed and weighted signals from present and past inputs and outputs. Instead of taking these inputs and outputs from certain sample times, they are shown as being taken from certain stages in the cascade.

The inputs and outputs of the plant and compensator at any stage in the cascade are equivalent to the inputs and outputs at a corresponding time step during the response of the system. For example, the feedback of the position error signal from the output of the plant to the input of the compensator is no longer shown as a feedback of the system output to its input. It is shown instead as the feeding forward of the output of stage k to the input of stage k+1, where k represents the time index and the cascade index equivalently.

With the system unwrapped in time, as described above, the system can be analyzed as a completely feedforward system. As such, a generalized form of the LMS algorithm, known in the Neural Network literature as back propagation of errors or simply 'back propagation', can be applied to determine the contribution of each plant and compensator in the cascade to the overall error. This effective error is then used in the LMS algorithm to adjust the compensator at each stage in the cascade. Since, in reality, each compensator in the cascade is just a representation of the single compensator in the original closed loop system as it was unrolled in time, the compensator adjustment made at each stage in the cascade must be averaged into one final adjustment that is made on the real compensator. This calculation is normally done offline and completely within the confines of the computer or microprocessor which is controlling the system.

Back propagation through time is discussed in "Back propagation through time: What it is and how to do it", Paul J. Werbos, Proceedings of the IEEE, Vol. 78, No. 10, October 1990.

The use of a feed-forward network to derive back propagation values is both time consuming and employs substantial processing assets to achieve an effective network construct. It is also dependent on the accuracy of plant model (since the method requires a model of the plant through which to calculate the back propagation values).

Accordingly, it is an object of this invention to provide an improved control circuit for a disk drive transducer head actuator.

It is a further object of the invention to provide an improved control circuit for a disk drive transducer head actuator which employs the actuator itself instead of relying on a model of the actuator.

It is another object of this invention to provide an improved compensator for a disk drive transducer actuator, which compensator employs back propagation error correction without requiring the use of a back propagation network.

It is yet another object of this invention to provide an improved compensator for a disk drive transducer head actuator wherein weighted back propagation values are employed to enable the achievement of increased accuracy operations of the actuator mechanism.

SUMMARY OF THE INVENTION

A method for adjusting a compensator in a feedback control system for a coupled plant, derives a plurality of forward error values from position error signals that are sensed as outputs from the plant in response to a disturbance of the plant's operation. The position error signals are determined over plural, increasingly forward, time segments. A plurality of compensator output values are also determined over predetermined plural increasing forward, time segments. The derived forward error values are applied as inputs to the plant in a back propagation order, that order being in reverse time order to the time order in which the forward position error values were derived. Plural back propagation error values result in response to the back propagation application of the forward position error values. The back propagation error values are derived from within a portion of the compensator which has been configured as a Direct Form II filter function. The plural back propagation error values are then utilized in conjunction with the compensator output values and the forward position error values to derive altered compensator gain stage values to enable a reduction of the forward error values. To provide increased correction capability, the forward position error signals are altered by weighting functions before being employed as inputs to achieve the back propagation error values.

DETAILED DESCRIPTION OF THE INVENTION

Figure 1:
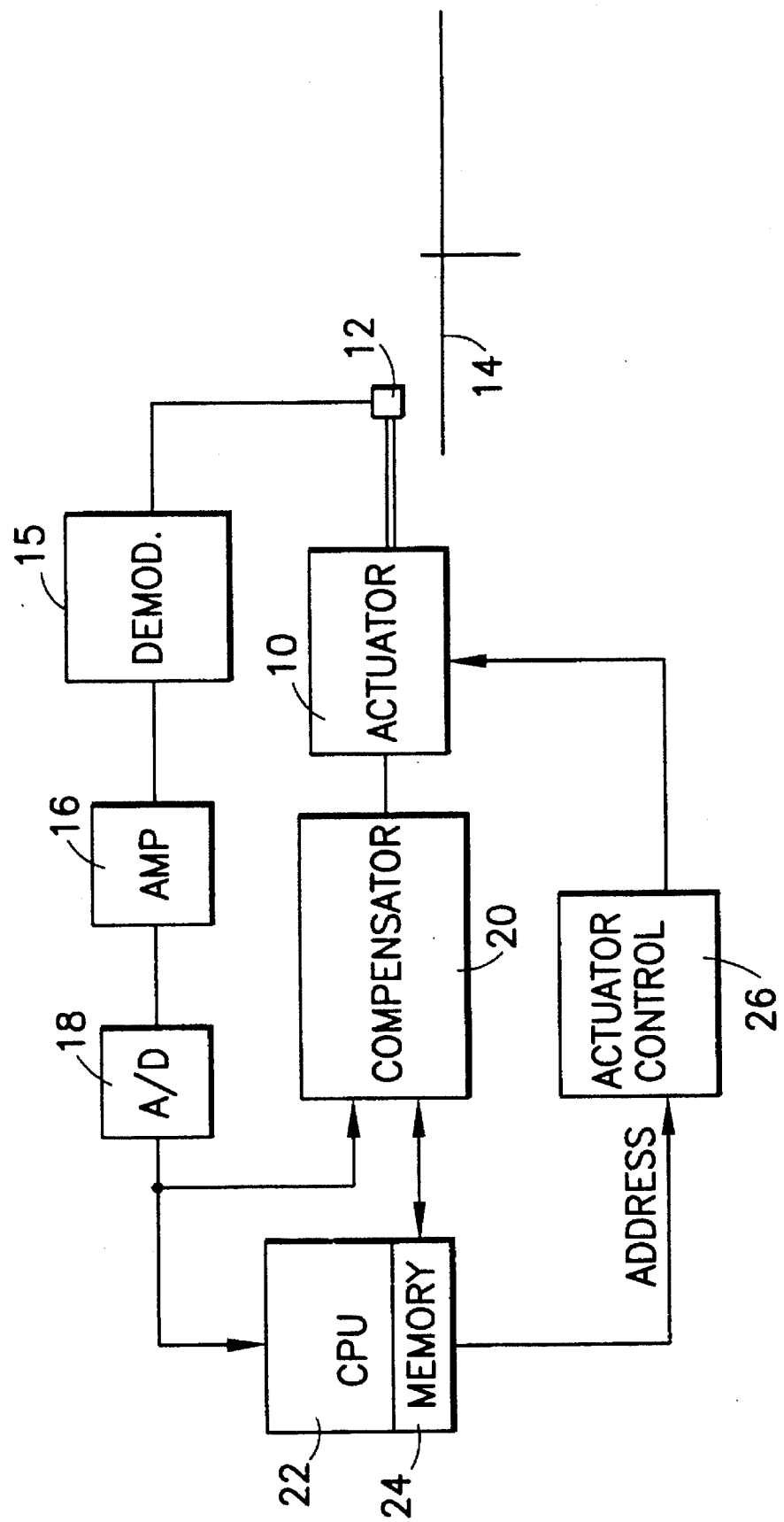
FIG. 1 is a block diagram of a prior art control system for a disk drive transducer head/actuator mechanism.
Figure 2:
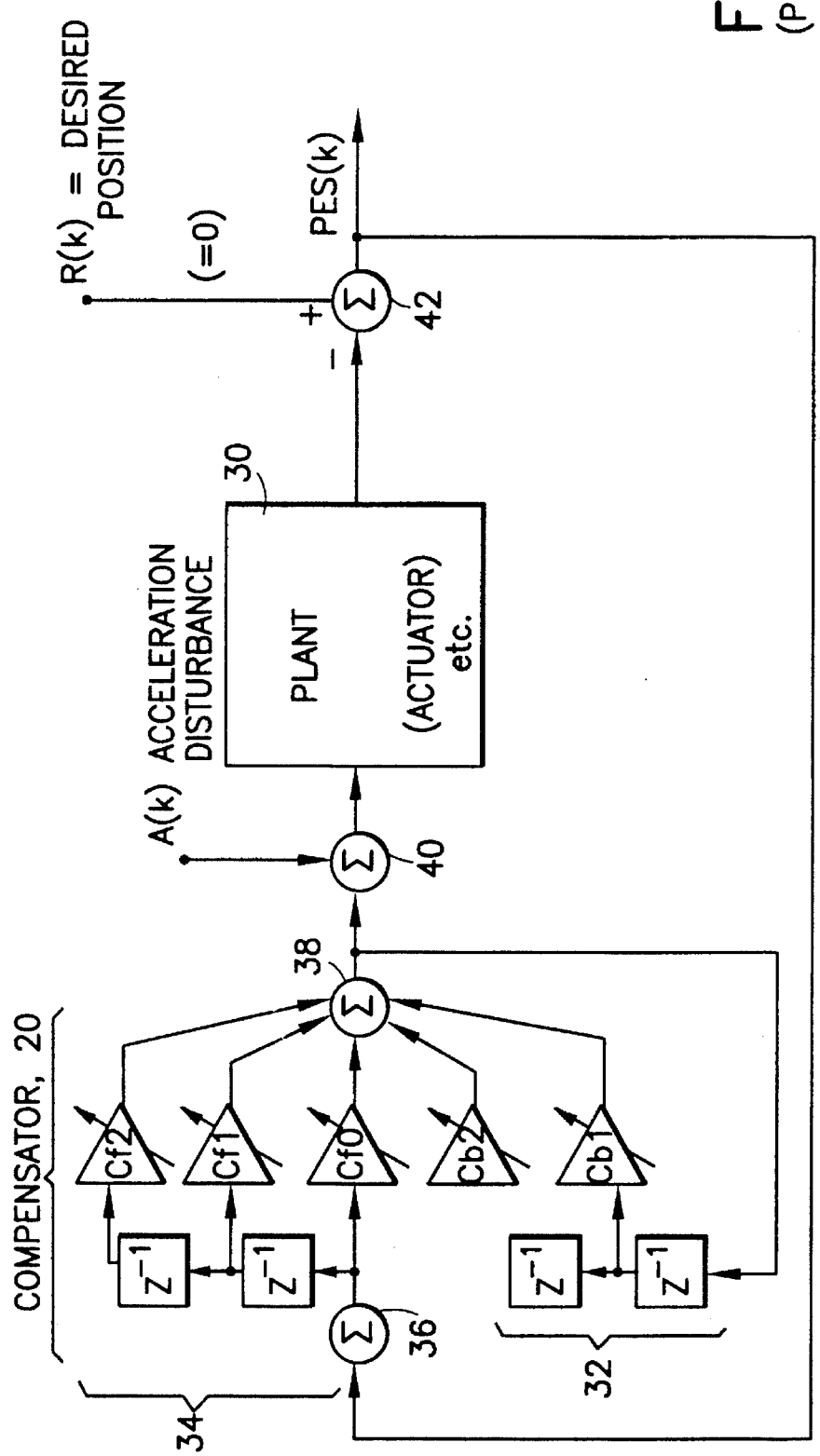
FIG. 2 is a prior art control schematic of the system of FIG. 1.
Figure 3A:
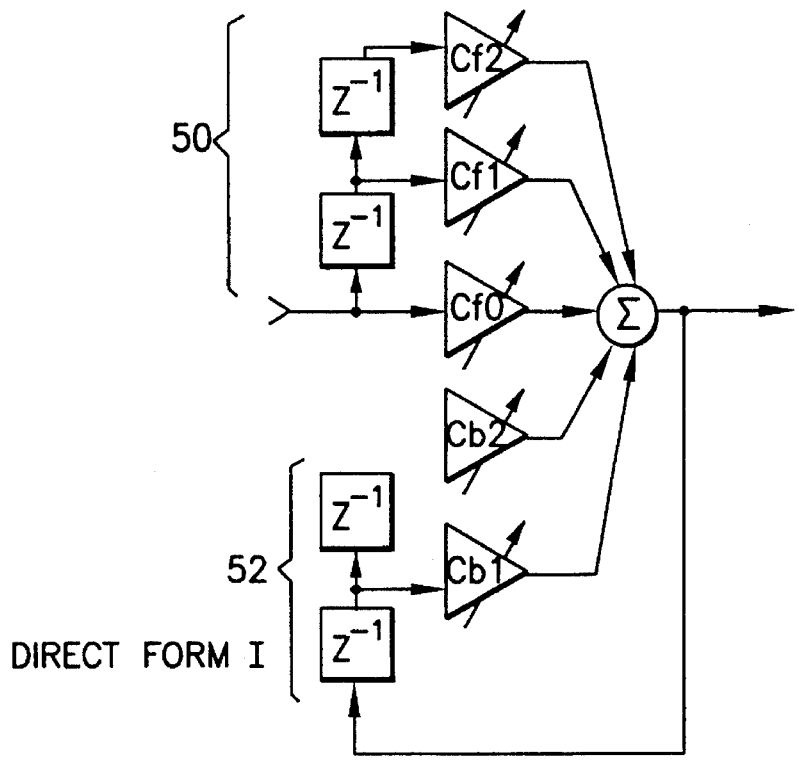
FIG. 3a is a control schematic of a Direct Form I compensator filter function, as illustrated in FIG. 2.
Figure 3B:
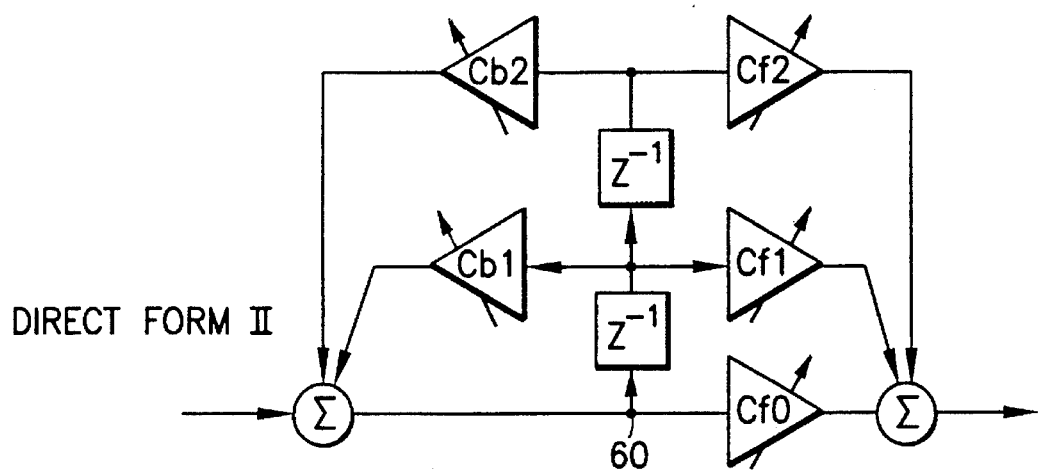
FIG. 3b is a control schematic of an equivalent filter function to that shown in FIG. 3a, but configured in the Direct Form II.
Figure 4:
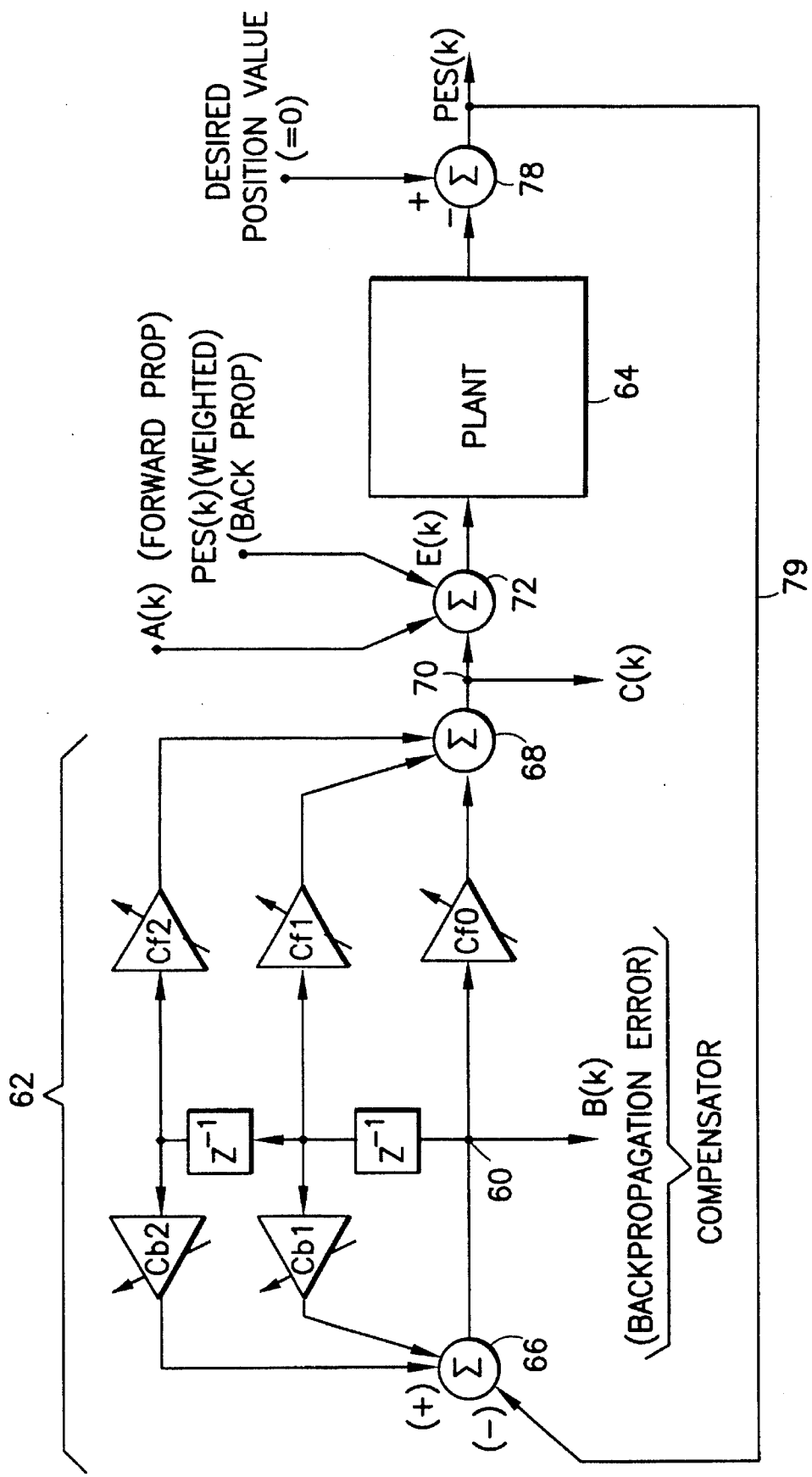
FIG. 4 is a control schematic which illustrates the use of a Direct Form II compensator function in a control network which performs the method of the invention.

Referring to FIG. 3a, FIR filter function 10 and IIR filter function 52 are as configured as shown in compensator 20 in FIG. 2. The filter function shown in FIG. 3a is known as the "Direct Form I". It is known that a Direct Form I filter can be configured as a Direct Form II filter as shown in FIG. 3b. A filter function, configured in Direct Form II, will respond identically to inputs as the Direct Form I filter function shown in FIG. 3a. It has been realized however the Direct Form II filter function provides direct access to a node 60 which enables a derivation of back propagation correction values when the Direct Form II filter function is embodied in a compensator. The importance of the direct accessibility of node 60 will be better understand by referring to FIG. 4 wherein a control schematic illustrates a compensator 62, configured in Direct Form II, which is utilized to provide compensating inputs to plant 64 so as to minimize PES outputs therefrom.

Compensator 62 includes an input summer 66 and output summer 68. Compensator correction values C(k) are derived at node 70 and are also fed to a summer 72. During a time when forward propagation errors C(k) are being determined, an acceleration disturbance A(k) is applied to summer 72. After PES values have been derived over k time intervals, the back propagation procedure is commenced and a plurality of back propagation error values E(k) are applied via a gain stage 74 to summer 72. The resulting outputs from plant 64 are compared in a summer 78 to a desired position value (generally set equal to 0). The output from summer 78 is a series of PES values taken over a plurality of times ranging from 0 to k. Each PES(k) value is recorded. Further, each PES(k) value is fed back via line 79 to summer 66 as an input to compensator 62.

Once all k values of C(k) and all k values of PES(k) have been recorded, a back propagation procedure commences to enable generation of k back propagation error values B(k).

To create inputs for the back propagation error derivation operation, each recorded PES(k) value is weighted in such a manner that later occurring PES(k) values are weighted more heavily than earlier occurring PES(k) values. This enables later-occurring error values to be emphasized in the back propagation procedure and enables their minimization when the back propagation error values are thereafter derived. This action promotes a quicker recovery by the system to a zero position error.

The criteria employed to weight the PES(k) values will vary in accordance with the application of the invention, however, a preferred weighting function is one which linearly increases with increases in time. Thus, if 32 samples of PES(k) have been recorded, the PES sample taken after time interval 1 is not weighted; the PES value taken at the end of time interval 2 is multiplied by a factor of 2; the PES value taken at the end of time interval 3 is multiplied by a factor of 3, etc. until the PES value taken at time k is multiplied by a value of k. In such manner, the later occurring PES values have an applied weighting factor which causes their values to be emphasized in the generation of the back propagation error values.

The back propagation error derivation procedure commences by selection of a latest PES(k) value (as taken at time k=n) and applying it to summer 72 as E(k). Plant 64 responds to the E(k) input value by providing a signal output to summer 78 which, in turn, produces a PES value in response. That value is fed back through a unit delay to summer 66 which combines the fed back value with output values from gain stages Cb1 and Cb2 and provides an output to node 60 which is the difference therebetween. The resulting value at node 60 is recorded as back propagation error value B(k) and is the back propagation error for the latest PES(k) value.

The B(k) value at node 60 is also fed to summer 68 via gain stage Cf0, via Cf1 after delay by a unit time segment delay and via Cf2 after a delay of 2 unit time segments. The summed output of summer 68 is then applied to summer 72 and the system is ready for a next weighted PES(k) value to be applied. That value is PES(k-1) (weighted) which is applied via gain stage 74 to summer 72 and the procedure repeats. The procedure continues until a B(k) value has been recorded for each PES(k) value originally accumulated. At this stage, for each interval from k=n to k=0, memory 24 contains the following data: values of C(k) for k=0 to k=n; PES(k) values from k=0 to k=n; and B(k) values for k=n to k=0.

Importantly, through the use of Direct Form II filter in compensator 62, each value of B(k) is immediately accessible without requiring any reconfiguration of the compensator filter into a feed-forward system as taught by the prior art.

The LMS algorithm is now used to derive altered gain values for each of gain stages Cf0, Cf1, Cf2, Cb1 and Cb2. The gain values for each of the gain stages is modified in accordance with the following relationships:

for k=n to 0

$Cf0^1 = Cf0 + 2\mu B(k) \cdot PES(k-1)$ $Cf1^1 = Cf1 + 2\mu B(k) \cdot PES(k-2)$ $Cf2^1 = Cf2 + 2\mu B(k) \cdot PES(k-3)$ $cCb1^1 = cCb1 + 2\mu B(k) \cdot C(k-1)$ $Cb2^1 = Cb2 + 2\mu B(k) \cdot C(k-2)$ next k: etc;

where: $\mu$=a value from 0 to 1 which controls the speed of adaptation.

The above-noted revised value for each gain element is then stored and is employed to set the gain of the respective gain element in compensator 62 for each respective sampled value of PES(k) that is outputted by summer 78. Each of the equations shown above implements the LMS algorithm for determining an altered value for the gain stage and assures a minimum error value output from summer 78.

It should be understood that the foregoing description is only illustrative of the invention. Various alternatives and modifications can be devised without departing from the invention. For instance, while a second order Direct Form II filter function has been described, a third, fourth or higher order filter function can also be employed in compensator 62. Input disturbances to the system can be designed to excite a certain band of frequencies in the head/arm structure to enable the system to derive correction coefficients that cancel such resonances. The input disturbance can be changed with each iteration so as to obtain an adjustment that is an average value for the variance of the input disturbances. Lastly, the weighting function can be changed at each iteration to obtain an adjustment that is, on the average, optimal for each of the weightings. Accordingly, the present invention is intended to embrace all such alternatives, modifications and variances which fall within the scope of the appended claims.

What is claimed is:

1. A method for adjusting a compensator in a feedback control system of a coupled plant, said compensator comprising an input summer, an output summer and first adjustable forward gain means for receiving signals from said input summer and providing signals to said output summer, at least one unit time segment delay means for receiving said signals from said input summer, at least second adjustable forward gain means for receiving signals from said at least one unit time segment delay means and for providing signals to said output summer, at least one adjustable back gain means for receiving signals from said at least one unit time segment delay means and for providing signals to said input summer, and an input to said input summer for receiving position error signals from an output of said plant, said method comprising the steps of:

a. deriving a plurality of forward error values from position error signals fed to said input summer from said plant in response to a disturbance of said plant, said position error signals determined at plural, increasingly forward, time segment values;

b. deriving a plurality of compensator output values from said output summer, said output values determined at said predetermined plural increasingly forward time segment values;

c. applying as an input to said plant, said derived forward error values in a back propagation order that is in reverse time order to a time order in which said forward error values were derived;

d. deriving plural back propagation error values in response to said applying said derived forward error values in said back propagation order, said plural back propagation error values derived from output signals from said input summer; and e. employing said plural back propagation error values, said compensator output values and said position error signals to derive altered compensator gain means values which enable a reduction of said forward error values.

2. The method as recited in claim 1, wherein step (a) further comprises a substep of altering said position error signals so as to create weighted forward error values and employing said weighted error values in step c.

3. The method as recited in claim 2, wherein said substep of altering causes forward error values determined at increasingly forward time segment values to be increasingly weighted.

4. The method as recited in claim 3, wherein said first adjustable forward gain means has a gain value Cf0, said second adjustable forward gain means has a gain value Cf1, said one adjustable back gain means has a gain value Cb1 and said employing step (e) performs a least mean squares procedure to derive altered gain values for Cf0, Cf1 and Cb1.

5. The method as recited in claim 2, wherein said deriving step (a) applies a disturbance signal to said plant which excites said plant about a preset band of frequencies to enable subsequent steps to derive altered compensator gain values in response.

6. The method as recited in claim 2, wherein said deriving step (a) applies an input disturbance that is changed for each iteration of said method to enable subsequent steps to derive averaged, altered compensator gain values in response to said changed input disturbances.

7. The method as recited in claim 2, wherein said weighted error values are changed for each iteration of the method.

* * * * *